(No Model.) 2 Sheets—Sheet 1.
E. G. LATTA.
VELOCIPEDE.
No. 461,191. Patented Oct. 13, 1891.
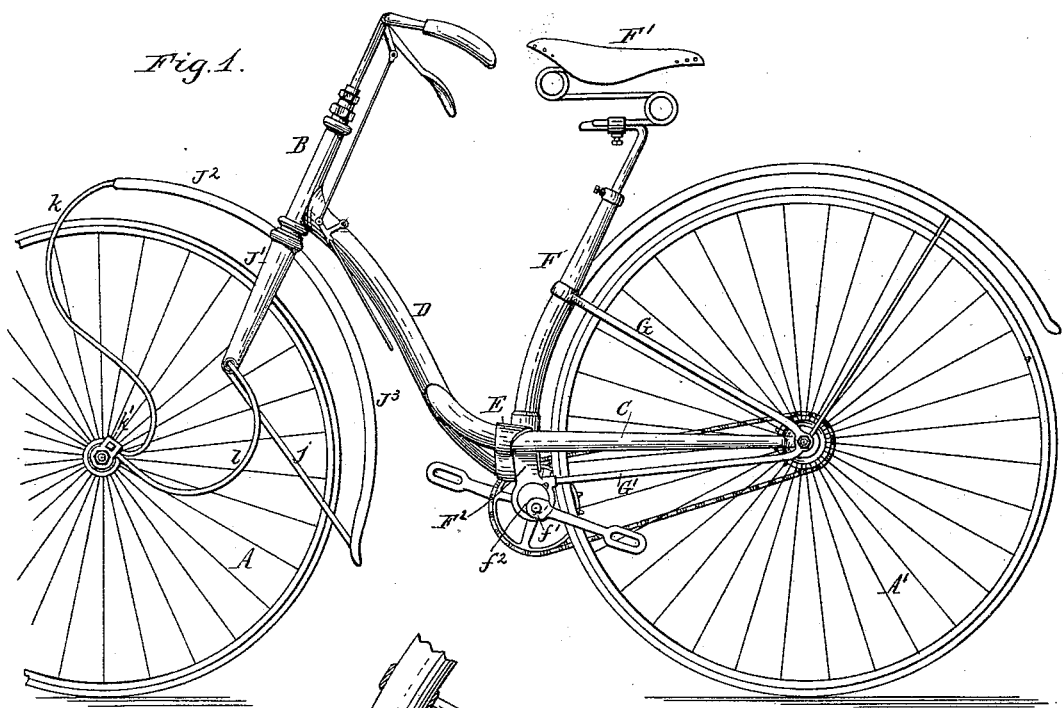
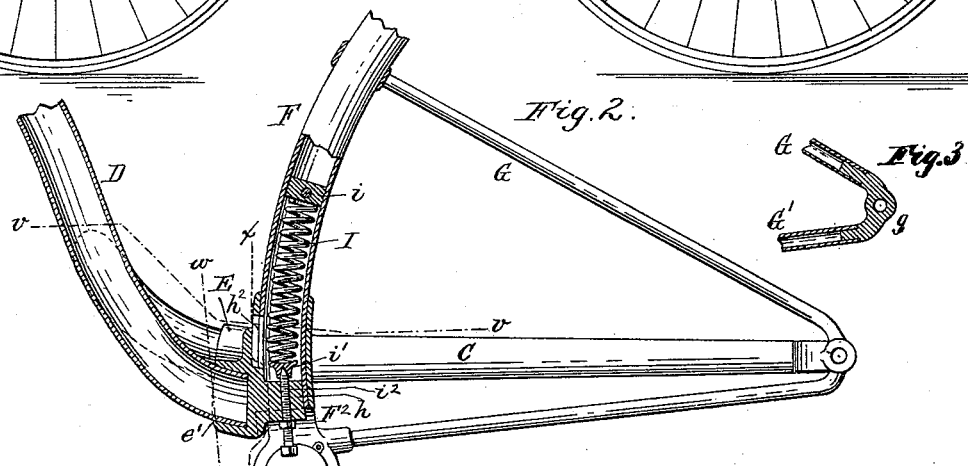
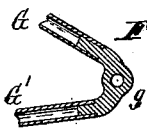
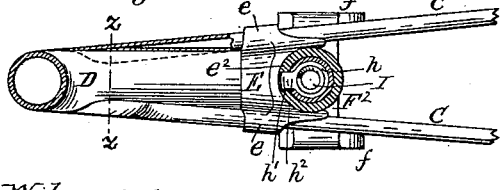
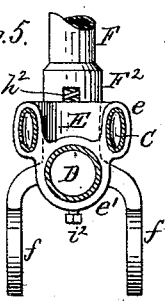
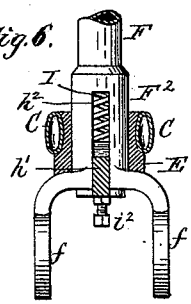
Witnesses:
Jacob Aussenblatt
Emil Neuhart
E. G. Latta Inventor.
By Wilhelm Bonner
Attorneys.
THE NORRIS PETERS CO., PHOTO-LITHO., WASHINGTON, D. C.

(No Model.) 2 Sheets—Sheet 2.

E. G. LATTA.
VELOCIPEDE.

No. 461,191. Patented Oct. 13, 1891.

Witnesses:
Emil Neuhart
Friedrich Gustav Wilhelm

E. G. Latta. Inventor.
By Wilhelm Bonner Attorneys.

UNITED STATES PATENT OFFICE.

EMMIT G. LATTA, OF FRIENDSHIP, NEW YORK.

VELOCIPEDE.

SPECIFICATION forming part of Letters Patent No. 461,191, dated October 13, 1891.

Application filed April 14, 1890. Serial No. 347,829. (No model.)

*To all whom it may concern:*

Be it known that I, EMMIT G. LATTA, a citizen of the United States, residing at Friendship, in the county of Allegany and State of New York, have invented new and useful Improvements in Velocipedes, of which the following is a specification.

My invention has for its objects to produce a bicycle suitable for use by either sex; to provide a yielding frame which shall be strong and durable; to produce a powerful brake of improved construction, and also to provide the machine with a light and efficient locking device for securing the steering-head against turning when not in use; to prevent folding of the machine, and for locking the same so that it cannot be used by unauthorized persons.

Figure 7:
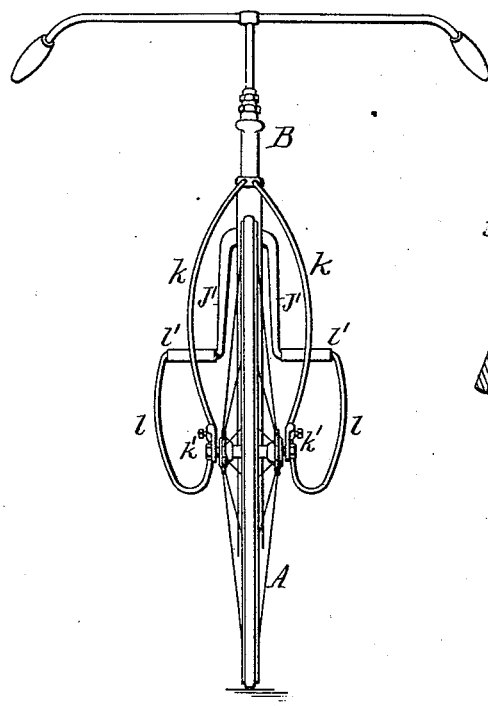
Figure 8:
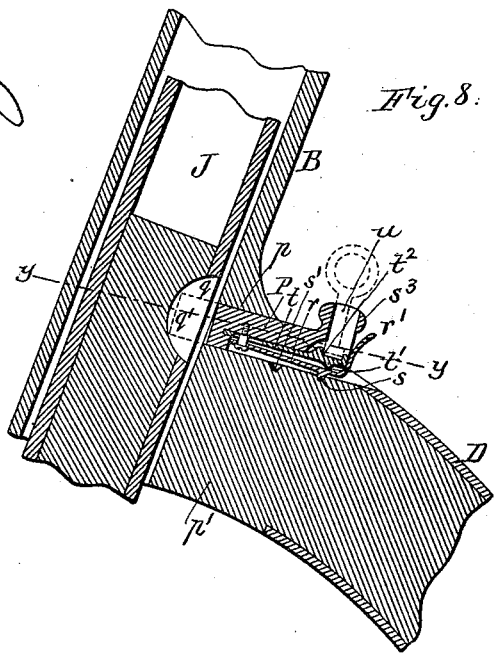
Figure 10:
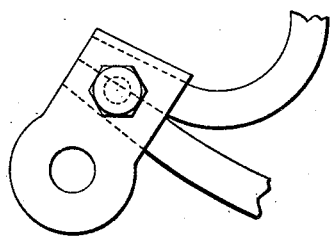
Figure 9:
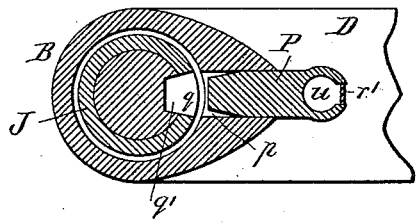
Figure 11:
Figure 12:
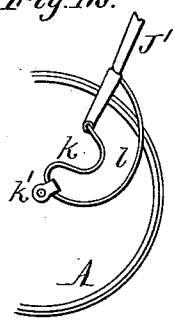
Figure 13:
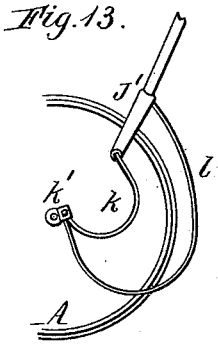

In the accompanying drawings, consisting of two sheets, Figure 1 is a side elevation of my improved machine with the pedals and a part of the brake mechanism omitted. Fig. 2 is a fragmentary sectional elevation, on an enlarged scale, of the main frame. Fig. 3 is a vertical section of the rear portion of the rear frame. Fig. 4 is a horizontal section in line $v\,v$, Fig. 2. Figs. 5 and 6 are vertical sections in lines $w\,w$ and $x\,x$, Fig. 2. Fig. 7 is a front elevation of the machine. Fig. 8 is a fragmentary vertical section of the steering-head, on an enlarged scale, showing the locking device. Fig. 9 is a cross-section thereof in line $y\,y$, Fig. 8. Fig. 10 is an enlarged side elevation of the clip whereby the lower end of the elastic front fork is attached to the front axle. Fig. 11 is a cross-section of the main frame in line $z\,z$, Fig. 4, on an enlarged scale. Figs. 12 and 13 are fragmentary views showing modified forms of the yielding front fork.

Like letters of reference refer to like parts in the several figures.

A represents the front wheel, A' the rear wheel, and B the steering-head.

C is the central fork of the rear wheel, and D is the tubular reach, secured at its upper front end to the steering-head and at its lower rear portion to the front end of the rear-wheel fork, forming a depressed main frame. The arms of the central rear-wheel fork are connected at a short distance from their front ends by a union or cross-head E, which is provided on opposite sides with lateral loops or sleeves $e\,e$, through which the front portions of the fork-arms pass, as clearly represented in Figs. 4, 5, and 6. The union E is formed in its front side with a circular socket $e'$, in which the lower rear end of the reach is secured. The fork-arms and reach are secured to the union E by brazing. The front portions of the central fork-arms extending beyond the union E are curved upwardly and embrace opposite sides of the reach, the ends of the fork-arms being swaged to a concave form to fit the reach and secured to the latter by brazing. To insure a close smooth lap of the ends of the rear fork-arms against the sides of the reach, the ends of the arms are thinned or tapered, as shown in Fig. 4. The central rear fork and the part C together form a strong reach connecting the front and rear wheel frames. By constructing the reach and central rear fork in this manner a tripple connection is obtained at the central part of the main frame where the greatest strains are exerted, thereby enabling the frame to more effectually withstand such strains. The rear ends of the fork C support the axle of the rear wheel in the usual manner.

F represents the tubular saddle-post, and F' the saddle supported thereon.

$F^2$ is a crank-shaft bracket secured to the lower end of the saddle-post and consisting of a sleeve surrounding the lower end of the post and provided with depending rings $f\,f$.

$f'$ is the crank-shaft, turning in bearings $f^2$, arranged in the rings $f\,f$.

G G' represent the upper and lower forks of the rear wheel, which are connected together at their converging rear ends by a forging or union $g$, through which the rear axle passes loosely. The upper fork G is secured at its front end to the upper part of the saddle-post and the lower fork is secured at its front end to the bracket, the two forks with the saddle-post forming a triangular frame, which is capable of swinging upon the rear axle as a pivot.

Referring to Figs. 2 and 4, $h$ represents a cylindrical lug projecting rearwardly from the union E, and connected to the latter by a narrow neck $h'$. This cylindrical lug is fitted in the lower tubular end of the saddle-post, and the latter is guided in its movements upon said lug, the lower end of the saddle-post and the surrounding sleeve being provided in their front sides with an upright slot $h^2$, through which the narrow neck $h'$ passes.

$i$ is a bearing block or plug secured within the lower portion of the tubular saddle-post, and I is a spiral supporting-spring arranged within the lower part of the saddle-post and interposed between the plug or block $i$ and a follower $i'$, which latter is operated by an upright adjusting-screw $i^2$. This screw is arranged in a threaded opening formed in the cylindrical lug $h$, and is held in place by a jam-nut bearing against the under side of the lug, as clearly shown in Fig. 2. The spring I supports the saddle-post, the weight of the rider, and the driving-gear and permits the saddle-post and driving-gear to rise and fall together. The saddle-post is curved concentric with the rear axle to permit of this movement of the post. The rear side of the union E is made concave to fit the front side of the saddle-post and forming a seat or guide $e^2$, which embraces the post and prevents undue lateral deflection thereof. Upon loosening the jam-nut of the adjusting-screw $i^2$ the latter may be adjusted to exactly regulate the tension of the spring in accordance with the weight of the rider.

J represents the steering-post, turning in the steering-head B, and J' is a short fork or downward extension of the steering-post, which straddles the upper portion of the front wheel.

$J^2$ is a tubular arm or guard secured to the steering-post and extending forwardly over the front wheel, and $J^3$ is a tubular mud-guard extending rearwardly over the wheel. The lower end of this mud-guard is connected with the lower ends of the short fork-arms J' by braces $j$, arranged on opposite sides of the front wheel.

Referring to Figs. 1 and 7, $k$ $k$ represent curved springs arranged in front of the axial line of the steering-pivot on opposite sides of the front wheel and extending from the front end of the arm or guard $J^2$, preferably, to the hub of the wheel, the springs being rigidly secured to the latter by unions or clips $k'$. These springs are constructed of spring-steel rods and are preferably bulged outwardly, as shown in Fig. 7, and bent to form a compound curve, as shown in Fig. 1. $l\,l$ represent curved springs arranged in rear of the axial line of the steering-pivot on opposite sides of the front wheel and extending in bow form from the lower ends of the short fork-arms J' to the clips or unions $k'$, in which latter their lower ends are rigidly secured. The lower ends of the springs $k\,l$, arranged in the clips $k'$, are preferably flattened and provided in their contiguous faces with curved notches or recesses, in which engages a transverse bolt or pin $k^2$, passing through the clip, as represented in Fig. 10. This forms a simple construction whereby the lower ends of both springs are tightly secured in the clip.

The springs $k\,l$ may be of round or angular cross-section, as desired, and the rear springs $l$ are preferably shorter and of larger size or diameter than the front springs $k$ to render the same stiffer, and thereby better adapt the combined action of the springs to the different strains to which they are subjected.

The springs $k\,l$ may be secured to the unions $k'$ in any desired manner; but their ends are preferably arranged at right angles to the axis of the steering-post, as shown, to prevent twisting of the rods under steering strains as much as possible.

The upper ends of the rear springs $l$ are preferably extended outwardly from the ends of the short fork J' in a horizontal plane to form foot-rests $l'$, these parts of the springs being preferably strengthened by a metallic sleeve, upon which the usual rubber sleeve is arranged, so as to render the foot-rests rigid. If desired, the lower ends of the short fork J' may be bent outwardly to form foot-rests and the upper ends of the springs $l$ secured to the outer ends of the foot-rests. From the outer ends of the foot-rests the springs $l$ are curved inwardly, downwardly, and forwardly to the clips $k'$. By this arrangement of the springs the front wheel is more effectually kept in proper alignment than when the springs are not extended outside of the plane of the unions $k'$. The forwardly-extending arm $J^2$ firmly supports the front springs $k$ forward of the steering-post, and this construction, in connection with the arrangement of the rear springs $l$, affords sufficient length to the springs to provide the necessary elasticity, while causing the steering-wheel to follow the movements of the handle-bar with practically the same certainty and readiness as when supported by a rigid fork.

The principal strains received by the front wheel are the twisting strains applied by the handle-bar through the steering-post, an upward strain when the wheel enters a rut or hole in the road or in passing down over an obstruction, and an upward and backward strain when the wheel strikes an obstruction in the road, the last-mentioned strain having the greatest effect upon the rider and the greatest tendency to check his speed.

The construction and arrangement of the springs $k\,l$ produces a spring-fork in which the two sets of springs are arranged out of line with each other and in which the springs are attached to the steering post or pivot at different distances from the center of the wheel. By this arrangement the usual objection of side play or excessive flexibility of ordinary spring-forks is largely overcome, and by constructing the springs of different length, size, and curvature they permit the wheel to move upward more easily than backward, thus cushioning the machine under an upward strain, as well as under the more severe upward and backward shock caused by striking an obstruction. This arrangement also causes the stiffer springs $l$ to push the front wheel forward over an obstruction, instead of permitting it to spring backward as far as it would if both springs were equally stiff. The front springs $k$ may be made separately; but they are preferably constructed of a single piece doubled at its center and connected with its doubled portion to the arm $J^2$. It is apparent that these springs would operate fairly well if made of rods of equal size or if made of the same length; also, that they may be connected to the rigid part of the steering-post at various distances from the rim of the wheel and that both springs may be secured outside of the wheel-rim or both near the rim. It is also obvious that more than two springs may be employed on each side of the wheel, if desired.

In the modifications illustrated in Figs. 12 and 13 both sets of springs are located in rear of the axial line of the steering-pivot and secured to the post at different distances from the center of the wheel.

It will be observed that in all of the various constructions of the spring-fork shown the two sets of springs are arranged out of line or in advance of each other, as distinguished from springs arranged side by side.

P represents a locking-bolt sliding in a slot $p$, formed in the upper end of the stub $p'$, secured in the upper end of the tubular reach, and which is adapted to pass through an opening $q$ in the steering-head and enter a recess $q'$, formed in the rear side of the steering-post, so as to hold the steering-post against turning in the head, and thereby prevent the machine from folding or doubling up upon placing it against a wall or other support. The base or lower solid portion of the steering-post is preferably extended upward into the hollow pivot of the post, as shown, to strengthen the post at this point.

$r$ is a flat spring or catch secured at its front end in a recess formed in the under side of the locking-bolt P and having at its free rear end a rearwardly-projecting thumb-piece $r'$. This spring is provided in its under side with a teat or projection $s$, which is designed to engage in one of two recesses or depressions $s'$, formed in the bottom of the slot $p$, so as to hold the bolt in a locked or unlocked position. The locking-bolt is provided at its upper rear end with a knob $s^3$ for shifting it. When the rider wishes to leave the machine standing against the wall or other support, he simply raises the locking-spring by means of its thumb-piece, so as to disengage its projection from the recess in the slot $p$, and then slides the bolt forward until the front end of the bolt enters the recess of the steering-post and the projection of the spring enters the other recess in said slot. The bolt firmly holds the steering-wheel in line with the rear wheel and prevents the machine from doubling up and falling over.

$t$ is an elastic locking-bar arranged between the bolt P and the spring $r$, and attached to the under side of the bolt by a screw passing through a longitudinal slot in the front portion of the bar, so as to permit the latter to be moved lengthwise upon the bolt. This locking-bar is provided on its under side with a projection $t'$, adapted to bear upon the spring $r$ when the bar is moved forward, and on its upper side with projecting transverse ribs $t^2$, the front one of which is inclined on its front side, as shown in Fig. 8, so that upon moving the bar forward the same will be depressed by the inclined rib striking the shoulder at the lower rear end of the locking-bolt. The locking-bar is readily shifted backward or forward by means of a suitable key inserted through an opening $u$ in the locking-bolt P and turning the key so as to bear with its head against one or the other rib $t^2$. Upon shifting the bar forwardly it bears against the spring-catch $r$ and firmly keeps it interlocked with the recesses $s'$, and upon releasing the bar it rises by its elasticity and releases the catch, permitting it to be raised. Sufficient space is left between the locking-bolt and the spring to allow of the necessary vertical play of the bar.

By my locking device the rider may securely lock the machine when placed where it is liable to be tampered with by unauthorized persons, or he may simply retain the wheels in line when leaving the machine temporarily.

I claim as my invention—

1. A velocipede-reach consisting of a single tube forming the front part of the reach, and two tubes arranged side by side and forming the rear portion of the reach or frame, the front ends of the side tubes being secured to the central tube and the rear end of the central tube being connected to the side tubes in rear of the front ends of the latter, substantially as set forth.

2. The combination, with the front and rear wheel frames, of a reach consisting of a single front tube and two rear tubes extending forwardly beyond the rear end of the front tube and secured at their front ends to opposite sides of said front tube, and a union or cross-head connecting the front portions of the rear tubes and to which the rear end of the front tube is secured, substantially as set forth.

3. The combination, with the front and rear wheel frames, of a reach consisting of a single front tube and two rear tubes extending forwardly beyond the rear end of the front tube and secured at their front ends to opposite sides of said front tube, a union or cross-head having lateral loops, through which the front portions of the side tubes pass, and a socket in which the rear end of the front tube is secured, substantially as set forth.

4. The combination, with the front and rear wheel frames and the connecting-reach, of a union or cross-head secured to the reach and provided with a cylindrical lug or head, a tubular saddle-post capable of vertical movement and guided with its lower portion upon said cylindrical head, a supporting-spring arranged within said saddle-post, and a crank-shaft bracket secured to the lower end of the saddle-post, substantially as set forth.

5. The combination, with the steering-pivot and steering-wheel of a velocipede, of a connecting-fork consisting of two sets or pairs of curved spring-rods extending from the central portion of the wheel to the steering-pivot near the rim of the wheel and attached to the steering-pivot at different distances from the center of the wheel, substantially as set forth.

6. The combination, with the steering-pivot and steering-wheel of a velocipede, of a connecting-fork consisting of two sets or pairs of curved spring-rods extending from the central portion of the wheel to the steering-pivot near the rim of the wheel, the two sets of springs being of different length to render one set more elastic than the other, substantially as set forth.

7. The combination, with the steering-pivot and steering-wheel of a velocipede, of a connecting-fork consisting of two sets or pairs of curved spring-rods extending from the central portion of the wheel to the steering-pivot near the rim of the wheel, the two sets of springs being of different curvature, whereby the springs resist the movement of the steering-wheel to a greater degree in one direction than in another, substantially as set forth.

8. The combination, with the steering-pivot and steering-wheel of a velocipede, of a connecting-fork consisting of two sets or pairs of curved spring-rods extending from the central portion of the wheel to the steering-pivot near the rim of the wheel, the rods constituting these two sets of springs being of different size or diameter to give the springs an unequal or differential resilience, substantially as set forth.

9. The combination, with the steering-pivot and the steering-wheel, of a connecting-fork provided at its lower end with foot-rests, and spring-rods extending from the outer ends of the foot-rests to the central portion of the wheel, substantially as set forth.

10. The combination, with the steering-pivot and steering-wheel of a velocipede, of a connecting-fork consisting of two sets of curved spring-rods secured at their upper ends to the steering-pivot and provided at their lower contiguous ends with notches or recesses, and a clip attached to the center of the steering-wheel, receiving the lower notched ends of said spring-rods and having a pin or bolt engaging in the notches of the spring-rods, whereby the same are confined in the clip, substantially as set forth.

11. The combination, with the steering-pivot and steering-wheel of a velocipede, of a connecting-fork consisting of spring-rods extending from the central portion of the steering-wheel to the steering-pivot and having their upper portions bent or offset to form foot-rests, substantially as set forth.

12. The combination, with the velocipede-frame provided with an opening or slot and the steering-post provided on its rear side with a recess adapted to register with said slot, of a horizontally-sliding bolt arranged in the opening in the frame and adapted to engage in the recess in the steering-post, whereby the two parts are interlocked, and a spring-catch secured at its front end to the sliding bolt and provided at its free end with a rearwardly-projecting thumb-piece and on its under side with a teat or projection adapted to engage in a recess in the frame, whereby the bolt is retained in position, substantially as set forth.

13. The combination, with the velocipede-frame provided with an opening and the steering-post provided on its rear side with a recess adapted to register with said opening, of a horizontally-sliding bolt arranged in the opening in the frame and adapted to engage in the recess in the steering-post, a spring-catch secured to the sliding bolt, and a locking-bar arranged between the sliding bolt and spring-catch and having ribs or projections for the engagement of a suitable key, substantially as set forth.

Witness my hand this 7th day of April, 1890.

EMMIT G. LATTA.

Witnesses.
   W. WARD RICE,
   FRED H. RICE.